United States Patent [19]
Cheever et al.

[11] Patent Number: 5,476,019
[45] Date of Patent: Dec. 19, 1995

[54] ROTATABLE HANDGRIP ACTUATING SYSTEM

[75] Inventors: John D. Cheever, Chicago, Ill.; Sam Patterson, Solana Beach, Calif.; Michael W. Larson; Tymme A. Laun, both of Chicago, Ill.

[73] Assignee: SRAM Corporation, Chicago, Ill.

[21] Appl. No.: 207,249

[22] Filed: Mar. 7, 1994

[51] Int. Cl.$^6$ ............................ B62K 23/04; B62M 25/04
[52] U.S. Cl. .............................. 74/506; 74/475; 74/489; 74/502.2; 74/517
[58] Field of Search ............... 74/475, 489, 502.2, 74/505, 506, 517

[56] References Cited

U.S. PATENT DOCUMENTS

| | | | |
|---|---|---|---|
| 3,218,879 | 11/1965 | Reed | 74/489 |
| 3,362,238 | 1/1968 | Hayashi et al. | 74/506 X |
| 4,900,291 | 2/1990 | Patterson | 74/488 X |
| 4,938,733 | 7/1990 | Patterson | 74/488 X |
| 5,102,372 | 4/1992 | Patterson et al. | 474/30 |
| 5,134,897 | 8/1992 | Romano | 74/489 |
| 5,197,927 | 3/1993 | Patterson et al. | 474/80 |

FOREIGN PATENT DOCUMENTS

| | | | |
|---|---|---|---|
| 585473 | 3/1994 | European Pat. Off. | |
| 9000359 | 4/1992 | France | |
| 3-37454 | 2/1991 | Japan | 74/506 |

Primary Examiner—Allan D. Herrmann
Attorney, Agent, or Firm—Jeffferson Perkins

[57] ABSTRACT

A twist grip cable system having a mandrel received over the handlebar of a bicycle and a pulling spool providing increased mechanical advantage which may be used for the full range of rotation or In the case of a variable mechanical advantage system, that is one with a variable radius spool, for only part of the range. To provide even greater mechanical advantage, with the spool complete dropped away, a groove or slot is provided in the mandrel into which the cable may fall.

21 Claims, 2 Drawing Sheets

ROTATABLE HANDGRIP ACTUATING SYSTEM

BACKGROUND OF THE INVENTION

I. Field of the Invention

This invention relates to a rotatable handgrip actuating system for use with a Bowden tube (cable within a tube) type motion translation system. More particularly, it relates to a rotatable handgrip actuating system for use in operating a derailleur cable on a bicycle.

II. Description of Related Art Including Information disclosed Under 37 CFR Secs. 1.97 & 1.98

One type of, shift actuator that is conveniently rotatable mounted on a handlebar and positioned so as not the require the rider to remove a hand or even a thumb to operate the actuator is disclosed in U.S. Pat. No. 4,900,291 issued Feb. 13, 1990 to one of the co-inventors of this application and assigned to the assignee of this application. U.S. Pat. No. 4,938,733 issued Jul. 3, 1990 to the same co-inventor of this application and assigned to the assignee of this application, discloses a modification of the shift actuator of the prior patent.

Another type of bicycle derailleur cable actuating system which is of the same general type as that of this invention is disclosed in U.S. Pat. No. 5,102,372 issued Apr. 7, 1992 to three of the co-inventors of this application and also assigned to the assignee of this application. To further match the mechanical operating characteristics of a twist grip cable actuating system with the relative cable movement and force requirements of a bicycle derailleur system, U.S. Pat. No. 5,197,927 issued Mar. 30, 1993 reveals the use of a "shovel cam" in combination with a "jack spool". This later patent issued to the same three inventors as the prior patent and again, is assigned to the assignee of this application. For the purpose of providing a full teaching of the construction and operating requirements of a bicycle derailleur-type shifting system, and particularly ones operated by a twist grip actuating system, the above-mentioned patents are incorporated herein by reference.

In general, twist grip cable pulling devices for controlling bicycle derailleurs are mounted on the handlebar. Thus, the handlebar diameter presents a practical limit on the minimum spooling radius of the twist grip control. As set forth above, and as described in detail in the above-mentioned patents, derailleurs may require a particular cable tension for actuating each different derailleur actuation step. The tension required may vary within the range of desired derailleur position settings. However, there is a practical limit to the maximum torque which is comfortably exerted on a twist grip by the typical human hand. Therefore, it is desirable to not only vary the mechanical advantage of the twist grip control, but also to maximize the mechanical advantage, that is to minimize the spool radius, corresponding to certain derailleur position settings.

Previous twist-grip designs such as that disclosed in U.S. Pat. No. 5,134,897, issued Aug. 4, 1992 and assigned to Campagnolo sought to minimize the spool radius by mounting the twist grip directly over the handlebar. However, this has proven to be undesirable in certain situations, such as in off the road riding, because abrasive dirt and mud can easily find its way between the often thin walled handlebar and the typically plastic twist grip. The abrasive material tends to stick to the plastic and then abrade the thin walled metal handle bar, which in light weight bicycles are frequently formed of a relatively soft metal like aluminum.

Other designs such as one marketed by Suntour avoided the twist grip/handlebar interaction by mounting a stationary tube or mandrel on the handlebar over which the twist grip rotates. The thickness of the mandrel adds to the spooling radius which, in the case of the Suntour design, necessitates the use of a separate jackshaft carrying more spools so as to gain the required mechanical advantage for actuating the derailleur control cable. This Suntour design is shown in published patent application WO93/18960 which is based on PCT/JP93/00335.

SUMMARY OF THE INVENTION

It is an object of this invention to provide a rotatable handgrip type actuating system, designed to be received over a handlebar, which maximizes the mechanical advantage by minimizing the radius at which the cable is pulled. It is a further object of this invention, in a preferred embodiment thereof, to provide a rotatable handgrip type actuating system which is provided with a mandrel received over the handlebar to protect the handlebar. It is a still further object of this invention to provide a maximum mechanical advantage in a rotatable handgrip type actuating system which was previously realized only in much more complex actuating systems, such as those using jack shafts carrying additional spools or cams. In another embodiment of this invention the cable is permitted to drop through the mandrel is, or the mandrel omitted when the handlebars are formed of a harder material, such as steel, which will not be as readily abraded as a softer material.

In accordance with this invention, a rotatable hand grip actuating system, which is received over a handlebar, is provided in which the mechanical advantage is maximized. Further, in a first embodiment of this invention, the rotatable hand grip actuating system of this invention combines the advantages of a mandrel shielding the handlebar with a mechanical advantage, previously only achievable without a mandrel, for at least part of the full range of rotation of the twist grip.

In a first embodiment of this invention the spooling radius, that is the radius at which the twist grip torque applied by the user's hand is applied to the cable, is equal to the handlebar radius, plus the thickness of the mandrel, plus the thickness of the twist grip spool for the initial increment of cable pull. This increment of movement typically corresponds to the derailleur position corresponding to the small chain ring. In this position, the derailleur control cable has a relatively low tension, and the amount of control cable and derailleur movement is relatively high. Between this position and the position corresponding to the middle chain ring, it is desirable, for certain front derailleur designs, to have a relatively high cable pulling rate and a correspondingly low mechanical advantage. However, for the same front derailleur designs, between the derailleur positions corresponding to the middle chain ring and the large chain ring, the cable tension required for actuation increases sharply. Therefore, for this part of the range of derailleur motion, it is desirable to make the mechanical advantage relatively high. The effective spool radius corresponding to the required mechanical advantage is actually less than the handlebar radius plus the mandrel thickness. To achieve this, a first embodiment of the present invention allows the twist grip spool radius to fall off sharply and in fact the twist grip allows the cable to fall through the spool and into a groove in the mandrel in order to minimize the effective radius for the last increment of cable pulling rotation.

In another embodiment of this invention the groove in the mandrel is actually a slot, such that the effective radius for the last increment of cable pulling rotation is the radius of the handlebar. As previously set forth, this embodiment offers increased mechanical advantage but is normally only acceptable for use with handlebars formed of a hard metal such as steel. In still another embodiment of this invention, designed for use with handlebars formed of a hard metal, the mandrel is eliminated such that when the cable drops off or falls through the spool, it rests directly on the surface of the handlebar.

Thus a rotatable hand grip actuating system constructed in accordance with this invention substantially flattens out the required progressively increasing actuation force of the front derailleur. The torque which must be exerted on the twist grip by the user's hand is, in all positions, within a comfortable range for manual control.

The use of decreasing radius spools for controlling such front derailleurs is well known. Lever type actuators have used this principle. However, in the case of lever type actuators the handlebar diameter is not a constraint on the minimum spooling radius because the levers are not mounted around nor do they rotate about the handlebar. In such lever type actuators the spool carries the cable throughout the range of rotation of the lever. In the case of the present invention, the rotating spool drops out of the way so that the effective spooling radius continues to decrease below the dimensions of the spool itself. This is very important and beneficial since as discussed above, the handlebar imposes a practical constraint on the smallest spooling radius.

DETAILED DESCRIPTION OF THE PREFERRED EMBODIMENTS

Figure 1:
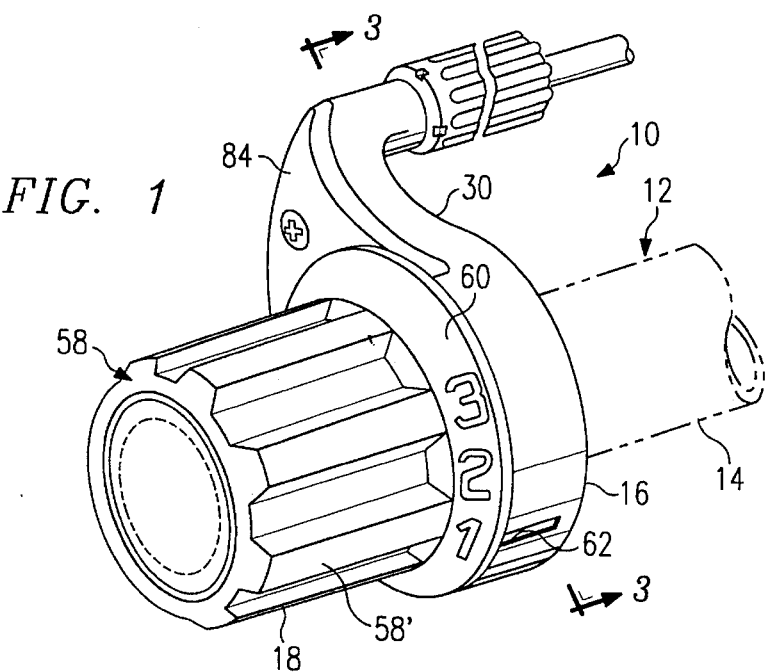
FIG. 1 is a perspective view of a rotatable handgrip actuating system in accordance with a preferred embodiment of this invention.
Figure 2:
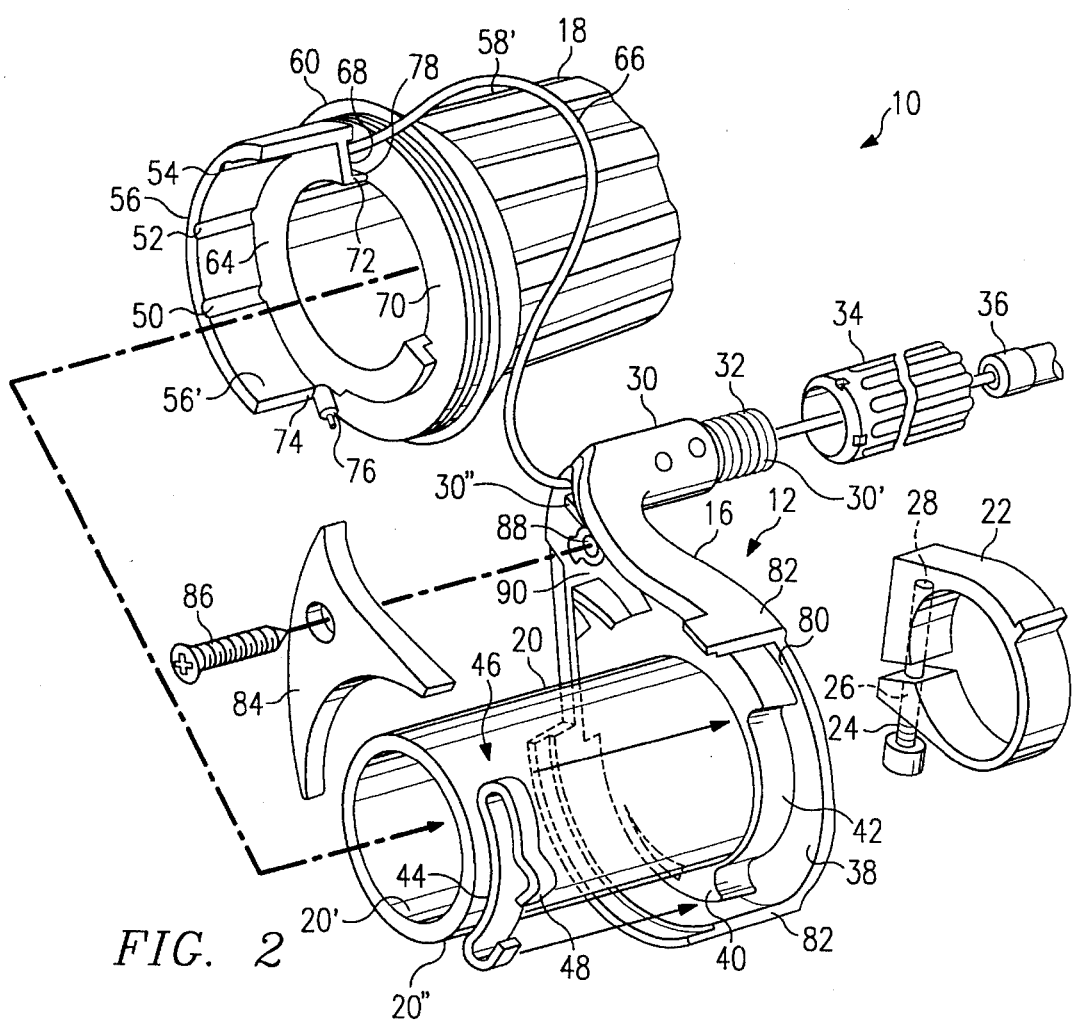
FIG. 2 is an exploded perspective view of the rotatable handgrip actuating system shown in FIG. 1.

Referring to FIGS. 1 and 2, the components on a rotatable handgrip actuating system and their assembly in accordance with a preferred embodiment of this invention will be described. A rotatable handgrip actuating system 10 in accordance with a first preferred embodiment of this invention is placed over a handlebar 12 or similar support member. The portion of the handlebar 14 shown projecting to the right in FIG. 1, is connected to the bicycle handlebar stem (not shown). The handlebar 12 also projects to the left of the system 10 as shown in FIG. 1 to support the handgrip normally placed at the end of the handlebar.

The system 10 has two principal components; the first member is, a housing 16 secured to the handlebar 12 and the second member is a rotatable member or twist grip 18. The housing 16 includes a first hollow cylindrical portion such as an elongated tube or mandrel 20 having an inner cylindrical surface 20' which is received in a snug fit on the handlebar 12. The housing 16 is formed with a pocket (not shown) on the right side as viewed in FIG. 2 for receiving a clamp 22 which secures the housing 16 to the handlebar 12. The U-shaped clamp 22 is secured to the handlebar by a bolt 24 which loosely passes through a hole 26 in one leg of the clamp and engages threads in a hole 28 provided in the other leg of the clamp.

Formed as a portion of the housing 16 is a cable guide tube 30, which is provided at its distal outer end 30' with external threads 32 for mating with internal threads provided on a coupler or securing portion 34. The coupler or securing portion 34 secures a cable tube 36 to the cable guide tube 30. Surrounding the mandrel 20, next to a radial extending wall 38 of the housing 16 is a spring retaining portion 40.

Formed in a circumferential surface of the spring retaining portion 40 is an elongated notch 42 which captures a first portion 44 of a formed spring 46, another portion of which cooperates with the twist grip 18 to define selected positions of the twist grip 18. First portion 44 of the spring 46 rests in the notch 42, while a convex bend 48 of an extension of the spring is engageable in notches 50, 52 and 54 formed on the inner cylindrical surface 56' of wall 56 of the twist grip 18 which faces the outer cylindrical surface 20" of the first hollow cylindrical portion or mandrel 20. As will be further described with respect to FIGS. 3A and 3B, the interaction of the first portion 44 of spring 46 with the notches 50, 52 and 54 define positions of the twist grip 18 with respect to the housing 16 which correspond to desired engagement positions of the derailleur mechanism.

The rotatable member or twist grip 18 is generally a second hollow cylindrical portion 58, formed with an outer or external gripping surface 58' and an adjoining enlarged portion 60 on which may be printed the numerals shown as 1, 2 and 3 in FIG. 1 which when located with respect to an index mark 62 on the housing 10 define three operating positions of the handgrip assembly. Extending to the left of the handgrip portion 58, as viewed in FIG. 2, is not only the wall 56, but also a cable retaining and engaging portion 64 of twist grip 18. An operating cable 66 is retained behind a radially extending wall portion 68 of portion 64 and a radial extending face 70 of the enlarged portion 60. The operating cable rests upon a spool or cable supporting portion 72 of variable radius formed between the wall portion 68 and the radially extending face 70 as shown in cross-section in FIGS. 3A through 4. The radius at which rotation of the twist grip 18 acts on the operating cable 66 is referred to as the spooling radius. Thus, a slot having a variable radial height is formed between the wall portion 68 and radially extending face 70. The radial height of the slot at end 74 of the slot is just slightly larger than the diameter of the cable 66.

An enlarged retainer or cable securing portion 76 is provided on the end of the cable to prevent it from being pulled through the slot. The spool or cable supporting portion 72 having dropped away at 78 where the cable 66 exits from the slot, the radial height of the slot is considerably higher than the diameter of the cable. While the cable is shown engaging the radially outward surface of the slot in FIG. 2, when the system is assembled and tension applied to the cable, it rests on the radially inward surface or spool 72 as shown in FIGS. 3A through 4.

With the cable 66 secured in the slot formed in the grip portion 18, and spring 44 placed in elongated notch 42, the grip is assembled to the housing 16 in the directions of the arrow such that the wall 56 is received in the space 80 between the outer wall 82 of the housing 16 and the spring retaining portion 40. To complete the assembly, a cover 84 is placed over the open portion at the inner end 30 of the cable guide tube 30 and secured in place by a screw 86 which is threadedly engaged in a hole 88 formed in a projection 90 extending from the housing 16.

Figure 3A:
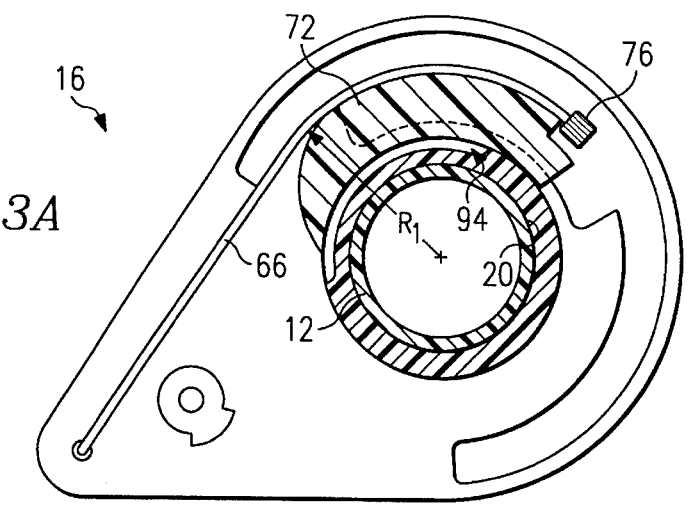
FIG. 3A is a view taken along the line 3—3 in FIG. 1, showing the rotatable handgrip actuating system in a first operative position.
Figure 4:
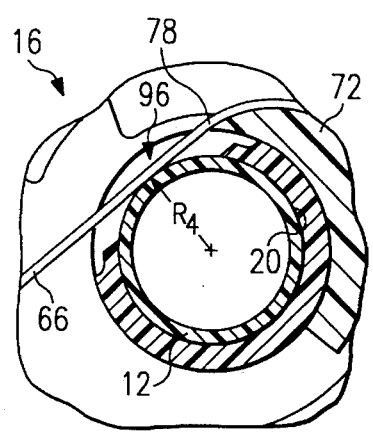
FIG. 4 is a fragmentary view, corresponding to FIG. 3C, of an alternate embodiment of this invention.

Referring now to FIGS. 3A through 4, the operation of the drop-away spool 72 of this invention will be further described. With the cable 66 fully extended from the housing 16, the position of twist grip 18, and more particularly of the spool 72, with respect to the housing 16 will be as shown in FIG. 3A. In this position, as the cable 66 leaves the support of the spool 72, it is held at a radius $R_1$ from the center of the handlebar. The radius $R_1$ substantially corresponds to the inside diameter of the wall 56. In this position, an incremental rotation of the twist grip 18 will cause the greatest movement of the cable 66, but with the least mechanical advantage.

Figure 3B:
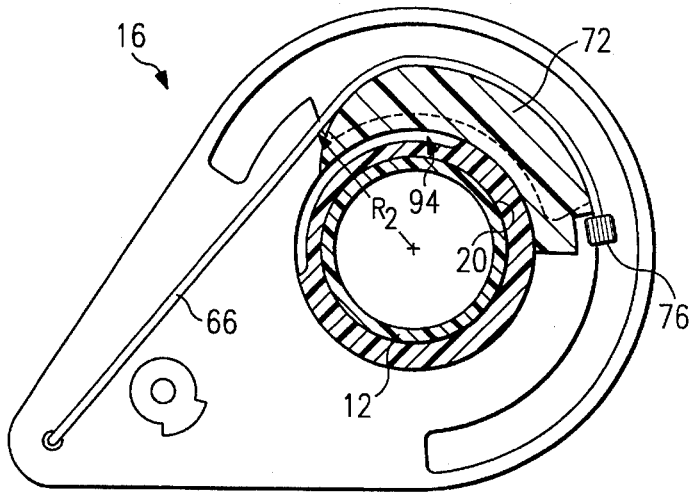
FIG. 3B is a view taken along the line 3—3 in FIG. 1, showing the rotatable handgrip actuating system in a second operative position.
Figure 3C:
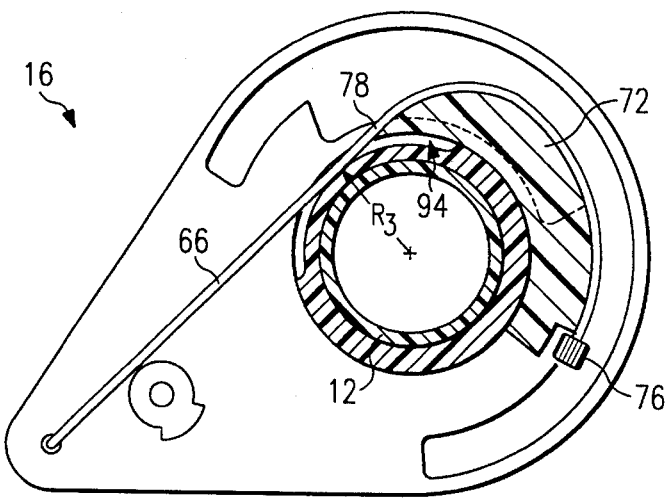
FIG. 3C is a view taken along the line 3—3 in FIG. 1, showing the rotatable handgrip actuating system in a third operative position.

As the handgrip 18 is rotated in the clockwise direction from the position shown in FIG. 3A to that shown in FIG. 3B, the cable on leaving the support of the spool 72 is held at a radius $R_2$ from the center of the handlebar. In this position, the spool 72 has dropped away or fallen to a lesser radius than that shown in FIG. 3A. Finally, as shown in FIG. 3C, as the handgrip 18 is rotated further in the clockwise direction, the spool 72 has completely dropped away, such that the effective radius at which the rotation of the handgrip 18 act on the cable is $R_3$. As shown in FIG. 3C, $R_3$ is the radius of the bottom of an arcuate notch 94 formed in the cable guide tube or mandrel 30 in axial alignment with the spool 72. The cable guide tube 30 under the arcuate notch 94 is preferably reduced to the minimum thickness which will withstand the pressure of the cable 66 on it without being deformed or ripped by the cable. In this position, the rotation of the handgrip with respect to the housing causes the minimum movement of the cable, but with the greatest amount of force for a given torque applied by the hand of an operator. Due to the radius being less than that possible without the spool 72 completely dropping away, an operator is able to apply a greater force to the cable 66 with the same torque applied to the twist grip 18.

In a second embodiment of the invention, as shown in FIG. 4, instead of a notch 94 being formed in the mandrel 20, a portion of the mandrel is removed, thereby forming a slot 96, such that the cable 66 actually rests upon the outside surface of the handlebar. In this embodiment the effective radius at which the rotation of the handgrip 18 acts on the cable is $R_4$, that is the radius of the outside surface of the handlebar 12. As previously set forth, while the further mechanical advantage provided by this embodiment is desirable, it would normally only be considered for use if the handlebar is formed of a harder metal which will not be damaged by the wrapping and rubbing of the cable directly on its surface. A further embodiment of this invention is an extension of the second embodiment, wherein the mandrel 20 is eliminated. Again, this further embodiment would only be considered for use when the handlebar is formed of a harder metal such as steel.

While preferred embodiments of the invention have been shown, it should be apparent to those skilled in the art that what have been described are considered at present to be preferred embodiments of the rotatable handgrip actuating system of this invention. In accordance with the patent statute, changes may be made in the system without actually departing from the true spirit and scope of this invention. The appended claims are intended to cover all such changes and modifications which fall in the true spirit and scope of this invention.

What is claimed is:

1. A rotatable handgrip actuating mechanism which is connected to a bicycle derailleur by a cable within a tube and is mountable on a bicycle handlebar comprising:
   a housing which secures the tube with respect to the handlebar,
   a rotatable member, rotatable about an axis of rotation with respect to said housing including,
      a hollow cylindrical portion having an inner cylindrical surface adapted to be received over the outer surface of the handlebar, and having an outer generally cylindrical gripping surface,
      a cable securing portion, a first end of the cable extending through said housing and into the tube and a second end secured to said cable securing portion of said rotatable member, such that as said rotatable member is rotated with respect to said housing, the cable is moved to and from said tube at an effective spooling radius with respect to said axis of rotation which is equal to the radius of said inner cylindrical surface of said
   hollow cylindrical portion for at least a portion of the rotation of said rotatable member.

2. The rotatable handgrip actuating mechanism for a bicycle derailleur of claim 1, wherein said rotatable member includes a cable supporting portion which has a variable radius with respect to the axis of rotation as the cable is moved through the tube.

3. The rotatable handgrip actuating mechanism for a bicycle derailleur of claim 1 being mounted substantially inboard from an end of a handlebar.

4. A rotatable handgrip actuating mechanism which is connected to a bicycle derailleur by a cable within a tube and is mountable on a bicycle handlebar comprising: a first member including,
   a first hollow cylindrical portion having an inner cylindrical surface adapted to be received over a cylindrical bicycle handlebar, and an outer cylindrical surface,
   a housing including a securing portion which secures the tube with respect to the handlebar, said housing causing the cable to approach said outer cylindrical surface tangentially,
   a second member rotatable about an axis of rotation with respect to said first member including,
      a second hollow cylindrical portion having an inner cylindrical surface adapted to be received over said outer cylindrical surface of said first member, and having an outer generally cylindrical gripping surface,
      a cable securing portion, a first end of the cable extending through said housing and into the tube and a second end secured to said cable securing portion of said second member, such that as said second member is rotated with respect to said first member, the cable is moved to and from said tube at an effective spooling radius with respect to said axis of rotation which is equal to or less than the radius of said inner cylindrical surface of said second member for at least a portion of the rotation of said second member.

5. The rotatable handgrip actuating mechanism for a bicycle derailleur of claim 4, wherein said second member includes a cable supporting portion which has a variable radius with respect to the axis of rotation as the cable is moved through the tube.

6. The rotatable handgrip actuating mechanism for a bicycle derailleur of claim 4 wherein the outer cylindrical surface of said first member has a groove to permit the cable to move further toward the axis of rotation such that the effective spooling radius at which the cable is moved through the tube for at least a portion of the rotation of said second member is less than the radius of said outer cylindrical surface of said first member.

7. The rotatable handgrip actuating mechanism for a bicycle derailleur of claim 4 wherein a portion of said first member is removed to permit the cable to move further toward the axis of rotation such that the effective spooling radius at which the cable is moved through the tube for at least a portion of the rotation of said second member is less than the radius of said outer cylindrical surface of said first member.

8. The rotatable handgrip actuating mechanism for a bicycle derailleur of claim 4 being mounted substantially inboard from an end of a handlebar.

9. A rotatable handgrip actuating mechanism which is connected to a bicycle derailleur by a cable within a tube and is mountable on a bicycle handlebar comprising:

a first member including,
  a first hollow cylindrical portion having an inner cylindrical surface adapted to be received over a cylindrical bicycle handlebar, and an outer cylindrical surface,
  a cable guide tube having inner and outer ends, said cable guide tube having an axis which at said inner end extends in a tangential direction with respect to said outer cylindrical surface, and at said outer end extends in a direction coaxial with the end of the derailleur cable to which it is attached, a second member, rotatable with respect to said first member including,
  a second hollow cylindrical portion having an inner cylindrical surface adapted to be received over said outer cylindrical surface of said first hollow cylindrical portion of said first member, and having an outer generally cylindrical gripping surface, the central axes of said first and second hollow cylindrical portions coinciding with each other,
  a cable securing and cable supporting portion, a cable, said cable passing through said cable guide tube, said cable having first and second ends, said first end of said cable secured to said cable securing portion, said second end of said cable extending from said outer end of said cable guide tube, said cable supporting portion extending circumferentially around said central axis of said first and second hollow cylindrical portions, at a variable radius from said central axis, such that as said second member is rotated at an essentially constant rate and with a generally constant applied torque with respect to said first member, the rate at which the cable is moved through said cable guide tube is variable, as is the force applied to it, during a portion of the rotation of the second member when the cable is supported at a relatively smaller radius the cable is moved at a slower rate but with a greater force, and during a portion of the rotation when the cable is supported at a relatively larger radius the cable is moved at a faster rate but with a lesser force.

10. The rotatable handgrip actuating system for a bicycle derailleur cable of claim 9, wherein said supporting portion continuously progresses from a larger radius to a shorter radius with respect to said central axis.

11. The rotatable handgrip actuating system for a bicycle derailleur cable of claim 9, wherein when said second member may be rotated to a position such that said cable rests on said bicycle handlebar prior to entering said cable feed tube, thereby further reducing the radius at which it is supported with respect to said central axis and decreasing the feed rate of said cable and increasing the force applied to said cable when said second member is rotated at a generally constant speed and with a generally constant applied torque.

12. The rotatable handgrip actuating system for a bicycle derailleur cable of claim 9, wherein when said second member is rotated to a position such that said cable is supported by said relatively smaller radius support portion, said cable rests on said outer cylindrical surface of said first hollow cylindrical portion prior to entering said cable feed tube, thereby further reducing the radius and decreasing the feed rate of said cable and increasing the force applied to said cable when said second member is rotated at a generally constant speed and with a generally constant applied torque.

13. The rotatable handgrip actuating system for a bicycle derailleur cable of claim 9, wherein a groove is provided in said outer cylindrical surface of said first hollow cylindrical portion, such that when said second member is rotated to a position wherein said cable is supported by said relatively smaller radius support portion, said table falls into said groove prior to entering said cable feed tube, thereby further reducing the radius and decreasing the feed rate of said cable and increasing the force applied to said cable when said second member is rotated at a generally constant speed and with a generally constant applied torque.

14. The rotatable handgrip actuating system for a bicycle derailleur cable of claim 13, wherein the thickness of the first hollow cylindrical portion under said groove is reduced to a minimum necessary to provide structural integrity when the cable rests thereupon.

15. The rotatable handgrip actuating system for a bicycle derailleur cable of claim 9, wherein the second end of said cable is connected to a derailleur shifting means.

16. The rotatable handgrip actuating system for a bicycle derailleur cable of claim 9, being engaged over the outside of the handlebar substantially inboard of an end of the handlebar.

17. A rotatable twist grip actuating system for moving a cable through a cable tube, and which is mountable on a support member comprising:
  a twist grip supported for rotation about the support member, having an outer grippable surface, a cable securing portion, and a cable supporting portion,
  a mandrel supported by and fixed relative to the support member, said mandrel having a portion to which is secured the cable tube,
  the spooling radius of said twist grip cable supporting portion, with respect to said twist grip axis of rotation, which supports the cable prior to its entering the cable tube decreases as the twist grip is rotated in one direction to allow the cable to move closer to the axis of rotation in some positions of said twist grip with respect to said mandrel, the radius of said supporting portion dropping off, such that at some further positions of said twist grip with respect to said mandrel, the cable is supported at a spooling radius substantially equal to the inside radius of the twist grip, whereby the mechanical advantage operating on the torque applied to the twist grip with respect to cable force is inversely proportional to the effective spooling radius, such that the cable is moved at a variable rate and with a variable force when the twist grip is rotated at a generally constant speed and with a generally constant applied torque.

18. The rotatable handgrip actuating system of claim 17, wherein said twist grip rotates directly on the support member and the effective spoiling radius for some angles of rotation is substantially equal to the outside radius of the support member.

19. The rotatable handgrip actuating system of claim 17, wherein said mandrel includes a tube surrounding and secured to the support member upon which said twist grip rotates, such that for some or all of the useful cable pulling rotation the effective spooling radius is substantially equal to the outside radius of said tube.

20. The rotatable handgrip actuating system of claim 17, wherein said twist grip rotates on said mandrel and said mandrel is provided with a groove such that for some angles of rotation said cable falls into said groove in said mandrel such that the effective spooling radius is substantially equal to the outside radius of the support member.

21. The rotatable handgrip actuating system of claim 17, wherein said twist grip rotates on said mandrel and for some angles of rotation said cable falls toward the axis of rotation such that for those angles of rotation the effective spooling radius is substantially equal to the outside radius of said mandrel.

* * * * *